United States Patent
Godfrey et al.

(10) Patent No.: US 10,605,912 B1
(45) Date of Patent: Mar. 31, 2020

(54) STORM TOP ADAPTIVE BEAM SCAN

(71) Applicant: Rockwell Collins, Inc., Cedar Rapids, IA (US)

(72) Inventors: Mark B. Godfrey, Melbourne, FL (US); Jacob G. Teague, West Melbourne, FL (US); Alexander C. Brokman, Melbourne, FL (US); Derek G. White, Indialantic, FL (US); Alexander M. Oransky, Melbourne, FL (US); Mark C. Fersdahl, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 700 days.

(21) Appl. No.: 14/871,524

(22) Filed: Sep. 30, 2015

(51) Int. Cl.
*G01S 13/95* (2006.01)

(52) U.S. Cl.
CPC .................. *G01S 13/953* (2013.01)

(58) Field of Classification Search
CPC ...... G01S 13/95; G01S 13/953; G01S 13/958; G01S 13/26; G01S 13/24; G01S 13/242; G01S 13/2664; G01S 13/2658; G01S 13/2605; G01S 13/2682; G01S 13/30; G01W 1/00; G01W 1/02; G01W 1/04; G01W 1/10; G01W 2001/003; H01Q 3/26; H01Q 3/24; H01Q 3/242; H01Q 3/2664; H01Q 3/2658; H01Q 3/2605; H01Q 3/2682; H01Q 3/30; H01Q 3/34
See application file for complete search history.

(56) References Cited

U.S. PATENT DOCUMENTS

| | | | | |
|---|---|---|---|---|
| 7,242,343 B1* | 7/2007 | Woodell | ..................... | G01S 7/41 342/26 B |
| 7,307,577 B1* | 12/2007 | Kronfeld | ................. | G01S 7/411 342/26 B |
| 7,486,220 B1* | 2/2009 | Kronfeld | ............... | G01S 13/953 342/26 B |
| 8,134,491 B1* | 3/2012 | Meyer | ....................... | G01S 7/24 342/65 |
| 8,994,578 B1* | 3/2015 | Finley | ................... | G01S 13/953 342/26 B |
| 9,000,972 B1* | 4/2015 | Cahoon | ................... | G01S 13/95 342/26 B |
| 9,869,766 B1* | 1/2018 | Breiholz | ................ | G01S 13/95 |

* cited by examiner

*Primary Examiner* — Peter M Bythrow
(74) *Attorney, Agent, or Firm* — Donna P. Suchy

(57) ABSTRACT

A weather radar system includes a non-transitory processor-readable medium that causes a processor to control a radar antenna to conduct a vertical radar scan of a weather cell over a vertical scan area and first and second horizontal scan segments of a horizontal radar scan over first and second horizontal scan areas; receive radar return data indicative of a characteristic of each scan area; determine a first and second altitude of a storm top of the weather cell for first and second locations based on the characteristic of a scan area; and cause a display device to display storm top height data indicative of the storm top of the weather cell based on the radar return data. The first horizontal scan segment is conducted at the first altitude and the second horizontal scan segment is conducted at the second altitude and with a higher resolution than the other radar scans.

19 Claims, 4 Drawing Sheets

STORM TOP ADAPTIVE BEAM SCAN

BACKGROUND

The inventive concepts disclosed herein relate generally to the field of weather detection. More particularly, the inventive concepts disclosed herein relate to detecting storm tops of weather cells.

Thunderstorms are a violent example of atmospheric convection that include uplifts and cooling of air and subsequent cloud formation. As a cloud forms, water vapor changes to liquid and/or to frozen cloud particles resulting in a large release of heat that becomes the principal source of energy for the developing cloud. The cloud particles grow by colliding and combining with each other, forming rain, snow, and/or hail. High level winds may shear the cloud top into an anvil shape. When droplets become heavy enough to fall against an updraft in the cloud, precipitation begins. Once precipitation begins the updraft weakens and is joined by a downdraft generated by the precipitation. This updraft-downdraft couplet constitutes a single storm cell. A typical storm is composed of multiple cells that form, survive for about half an hour, and then weaken and disperse. In some circumstances, new cells may replace old cells making it possible for some storms to continue for up to several hours.

Storm tops are hazards to aircraft. Conventionally, pilots use weather radar scans to detect and avoid hazardous weather. Effectively and efficiently identifying and predicting storm tops using a weather radar is especially beneficial for pilots that need to fly over or around the storm cell to avoid the hazardous weather. Weather radar systems are capable of detecting precipitation and variations of the refractive index in the atmosphere that may be generated by local variations of temperature or humidity. The returned signal from the transmitted pulse encountering a weather target has an amplitude, a phase, and a polarization. The amplitude may be used to determine the reflectivity and to estimate the mass of precipitation per unit volume or the intensity of precipitation through the use of empirical relationships.

Some modern weather radar systems automatically perform a volume scan consisting of a series of full azimuth rotations of the antenna at several elevation angles. The raw polar data may be stored for further data processing and archiving. Using application software, a wide variety of meteorological products may be generated and displayed as images on a display system. Grid or pixel values and conversion to x-y coordinates are computed using three-dimensional interpolation techniques. Each image pixel represents a color-coded value of a selected variable such as the reflectivity, the rainfall rate, and/or other meteorological parameters.

Turbulence is the leading cause of in-flight injuries to passengers and cabin crews on aircraft. A high turbulence region may exist above a storm cell, but is difficult to detect with radar due to the low reflectivity. However, if a weather radar system can detect and predict the location of a high turbulence region with sufficient response time, aircraft may more effectively avoid these regions.

A need exists for a weather radar system that efficiently detects the height of storm cells while minimizing the number of scans needed to accurately detect storm tops. What is further needed are systems and methods for predicting a change in the height of the storm cell so aircraft can better respond to changing conditions and so aircraft pilots have a more accurate understanding of weather conditions along flight paths. Such storm top detection systems and methods would make air travel safer, more efficient, and lead to fewer weather-related flight implications for aircraft.

SUMMARY

In one aspect, embodiments of the inventive concepts disclosed herein are directed to a weather radar system. The weather radar system includes at least one processor coupled with a non-transitory processor-readable medium storing processor-executable code for causing the at least one processor to control a radar antenna to conduct a vertical radar scan of a weather cell over a vertical scan area, receive vertical radar return data indicative of a characteristic of the vertical scan area, determine a first altitude of a storm top of the weather cell for a first location based on the characteristic of the vertical scan area, and control the radar antenna to conduct a first horizontal scan segment of a horizontal radar scan of the weather cell over a first horizontal scan area. The first horizontal scan segment is conducted at the first altitude. The processor-executable code further causes the at least one processor to receive first horizontal radar return data indicative of a characteristic of the first horizontal scan area, determine a second altitude of the storm top for a second location based on the characteristic of the first horizontal scan area, and control the radar antenna to conduct a second horizontal scan segment of the horizontal radar scan over a second horizontal scan area. The second horizontal scan segment is conducted at the second altitude. The processor-executable code further causes the at least one processor to receive second horizontal radar return data indicative of a characteristic of the second horizontal scan area from the second horizontal scan segment, and cause a display device to display storm top height data indicative of the storm top of the weather cell based on at least one of the vertical radar return data, the first horizontal radar return data, and the second horizontal radar return data.

In a further aspect, embodiments of the inventive concepts disclosed herein are directed to a method. The method includes controlling a radar antenna to conduct a vertical radar scan of a weather cell, receiving radar return data indicative of a characteristic of a vertical scan area of the weather cell from the vertical radar scan, determining a location of a storm top of the weather cell based on the radar return data, wherein the location includes an altitude, controlling the radar antenna to conduct a horizontal radar scan of the weather cell, and receiving radar return data indicative of a characteristic of a horizontal scan area of the weather cell from the horizontal radar scan. The first horizontal radar scan includes a first horizontal scan segment conducted at a first altitude and a second horizontal scan segment conducted at a second altitude. The first altitude is the altitude of the storm top as determined based on the characteristic of the vertical scan area and the second altitude is determined based on the characteristic of the horizontal scan area.

In a further aspect, embodiments of the inventive concepts disclosed herein are directed to an adaptive horizontal beam scanning system. The adaptive horizontal beam scanning system includes a weather radar system including a radar antenna, and at least one processor coupled with the weather radar system and a non-transitory processor-readable medium storing processor-executable code. The processor-executable code causes the at least one processor to transmit a radar beam in a horizontal manner along a first horizontal area of a weather cell, wherein the first horizontal area has a baseline reflectivity value, receive radar return data indicative of a reflectivity of the first horizontal area of the weather cell, transmit the radar beam in a vertical manner along a first vertical area of the weather cell based on the reflectivity of the first horizontal area changing a threshold amount from the baseline reflectivity value, receive radar return data indicative of a reflectivity of the first vertical area of the weather cell, transmit the radar beam in a horizontal manner along a second horizontal area of the weather cell, receive radar return data indicative of a reflectivity of the second horizontal area of the weather cell, transmit the radar beam in a vertical manner along a second vertical area of the weather cell based on the reflectivity of the second horizontal area changing a threshold amount from the baseline reflectivity value, receive radar return data indicative of a reflectivity of the second vertical area of the weather cell, and cause a display device to display storm top height data indicative of the storm top of the weather cell based on the radar return data.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Before turning to the figures, which illustrate exemplary embodiments of the inventive concepts disclosed herein in detail, it should be understood that the inventive concepts disclosed herein are not limited to the details or methodology set forth in the description or illustrated in the figures. It should also be understood that the terminology is for the purpose of description only and should not be regarded as limiting. For example, the inventive concepts disclosed herein are described with reference to an aircraft, however, it will be appreciated that the inventive concepts are not limited to being practice on or with reference to an aircraft. The inventive concepts disclosed herein are configured to adaptively scan storm cells to more efficiently detect storm tops and provide more precise weather radar data.

Figure 1:
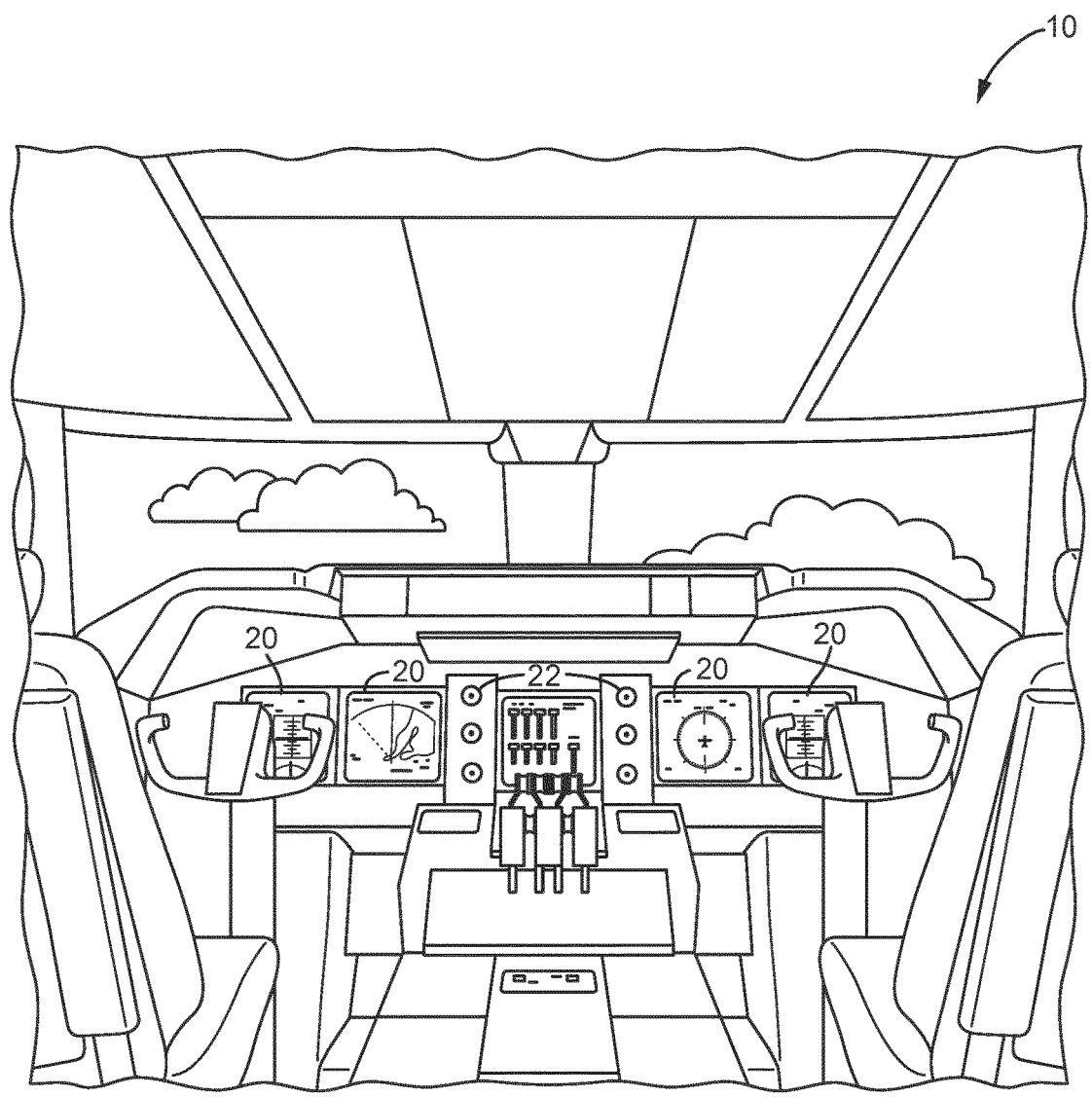
FIG. 1 is a perspective view schematic illustration of an aircraft control center or cockpit, accordingly to an exemplary embodiment.

Referring to FIG. 1, a perspective view schematic illustration of an aircraft control center or cockpit 10 is shown accordingly to an exemplary embodiment of the inventive concepts disclosed herein. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to provide a rendered display from the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 2:
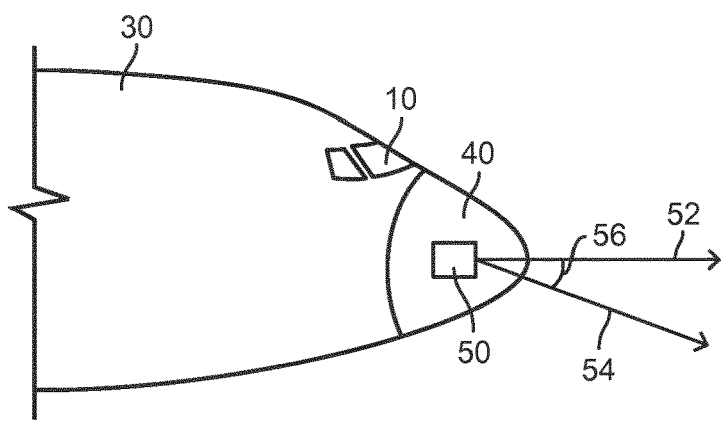
FIG. 2 is a side view schematic illustration of a front of an aircraft, according to an exemplary embodiment.

Referring now to FIG. 2, a side view schematic illustration of a front of an aircraft 30 is shown according to an exemplary embodiment of the inventive concepts disclosed herein. The aircraft 30 includes a nose 40, a radar system 50, and the aircraft control center or cockpit 10. The radar system 50, such as a weather radar system or other radar system, is generally located inside the nose 40 of the aircraft 30 or inside the cockpit 10 of the aircraft 30. According to exemplary embodiments of the inventive concepts disclosed herein, the radar system 50 may be located anywhere on the aircraft 30, such as on the top of the aircraft 30, on the belly of the aircraft 30, on the tail of the aircraft 30, or on either or both sides of the aircraft 30. Various components of the radar system 50 may be distributed at multiple locations throughout the aircraft 30. The radar system 50 may include or be coupled to an antenna system of the aircraft 30. The radar system 50 or other equipment onboard the aircraft 30 may be configured to receive weather data from other sources. For example, the radar system 50 or other equipment aboard the aircraft 30 may receive weather data from ground-based weather radar systems, satellite-based systems, and from aircraft-based system of other aircraft. The radar system 50 may be any radar system configured to detect or receive data for the systems and methods of the inventive concepts disclosed herein. According to exemplary embodiments of the inventive concepts disclosed herein, the radar system 50 may be an RTA-4218 MULTISCAN radar system, a WXR-2100 MULTISCAN radar system, or similar system manufactured by Rockwell Collins, Inc., and configured in accordance with the inventive concepts described herein.

The radar system 50 may generally operate by sweeping a radar beam in a horizontal direction or horizontally back and forth across the sky. For example, the radar system 50 may conduct an initial horizontal sweep 52 directly in front of the aircraft 30 and a second horizontal sweep 54 at a downward tilt angle 56 (e.g., 20 degrees downward). In some embodiments, the horizontal sweeps 52, 54 may include a plurality of horizontal scan segments. Returns from different tilt angles may be electronically merged to form a composite image for display on an electronic display, such as the flight displays 20 in the aircraft control center 10. Returns may also be processed to, for example, distinguish among terrain, weather, and other objects, to determine the height of the terrain, to determine the height of the weather, and to determine the height of other objects.

The radar system 50 may also sweep a radar beam in a vertical direction or vertically back and forth across the sky. In some embodiments, the radar system 50 may sweep a radar beam vertically back and forth at varying vertical tilt and azimuth angles. Results from the different vertical tilt angles may be analyzed to determine a characteristic of weather. For example, the altitude, range, and vertical height of weather conditions may be determined using the vertical scan results. The vertical scan results may be used to form an image for display on an electronic display. For example, a vertical profile view of the weather may be generated and provided to flight crew on the flight display 20 of the aircraft control center 10. The profile view may be used by an aircraft crew member to determine height, range, hazards and threats, and other relevant information that may be utilized by an aircraft crew member to evaluate a current course or to change the course of the aircraft to avoid the detected weather condition.

Figure 3:
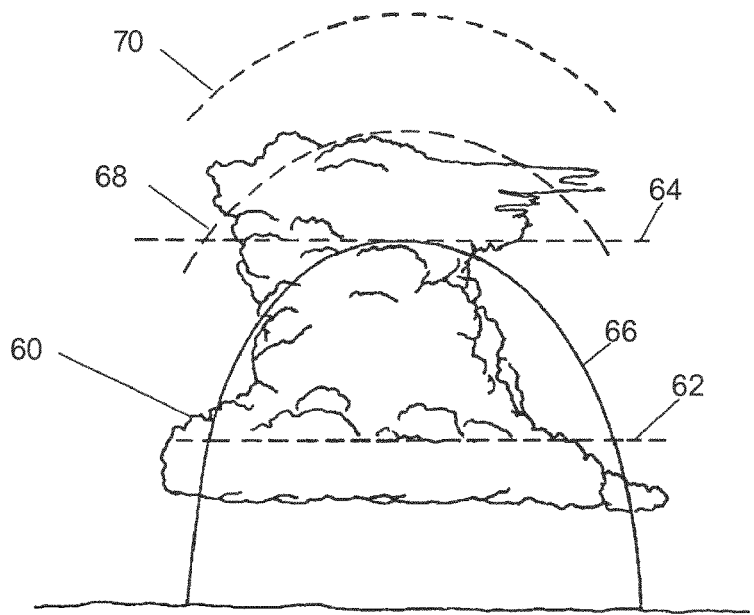
FIG. 3 is a schematic illustration of spatial characteristics of an exemplary weather cell or thunderstorm.

With reference to FIG. 3, a schematic illustration of spatial characteristics of an exemplary weather cell or thunderstorm 60 is shown. The portion of the thunderstorm 60 below an initial altitude 62 contains water in liquid form. The portion of the thunderstorm 60 below a second altitude 64 and above the first altitude 62 contains a mixture of ice and water in liquid form. The portion of thunderstorm 60 above the second altitude 64 contains only ice. Most of the reflectivity of a storm originates from the moisture the storm contains. Oftentimes, the top of the storm is significantly higher than indicated by the moisture-based radar data acquired from onboard radar systems (e.g., the radar system 50). Based on the geometry of the thunderstorm 60, regions of the thunderstorm 60 may be defined by their ability to be detected by radar, their visibility to a pilot, and their effect on an aircraft. As shown, the thunderstorm 60 includes an initial region 66 that includes the liquid water and the mixed ice and water portions of the thunderstorm 60. The first region 66 is detectable by an aircraft weather radar system 50 due to the high and moderate radar reflectivity of the water and ice mixture in this portion of the thunderstorm 60. A storm top 68 typically forms above the first region 66. The storm top 68 typically includes mostly ice and may be visible to the human eye but is not typically detectable by radar at long range (e.g., due to low radar reflectivity). The thunderstorm 60 also includes a second region 70 (above the storm top 68) that is typically not visible to aircraft crew or detectable by aircraft radar systems. The second region 70, just above the storm top 68, is typically a region of high turbulence which can affect the stability of an aircraft.

Figure 4:
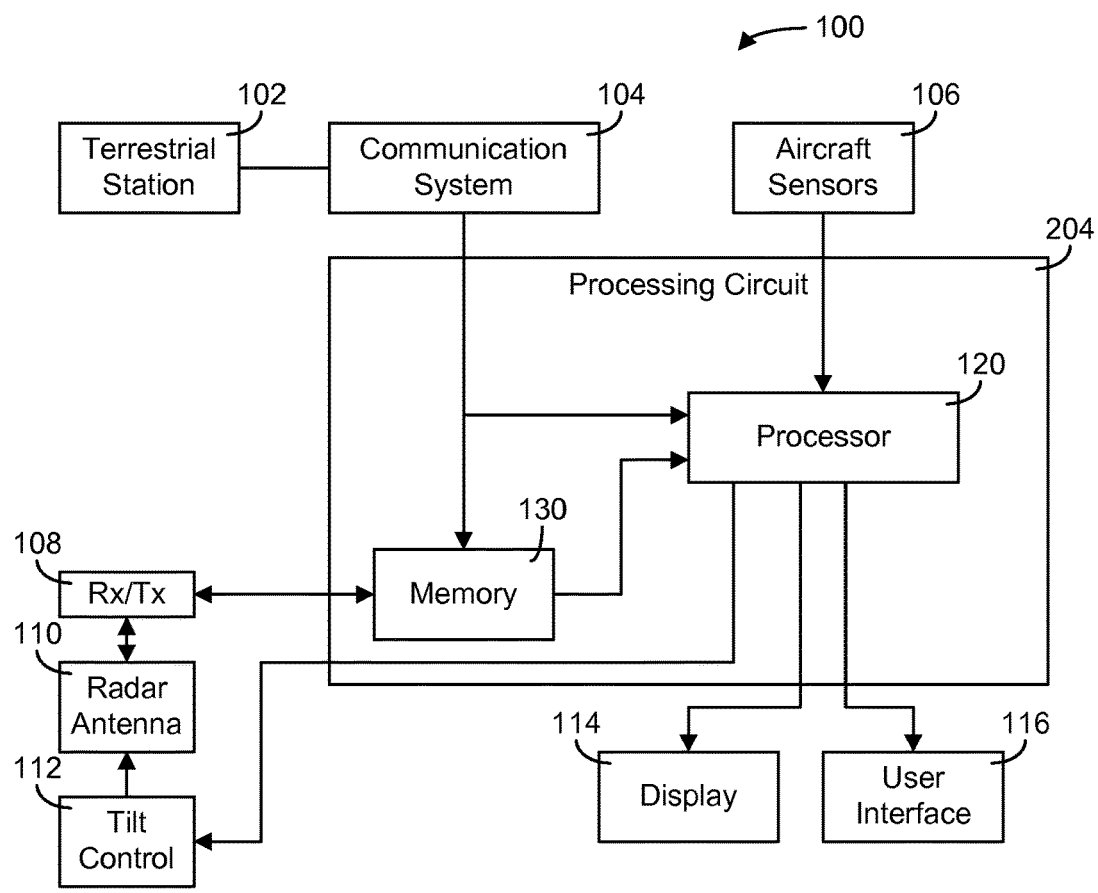
FIG. 4 is a block diagram of a storm top adaptive beam scanning system including a processing circuit, according to an exemplary embodiment.

Referring now to FIG. 4 a block diagram of a storm top adaptive beam scanning system 100 including a processing circuit 204 is shown accordingly to an exemplary embodiment of the inventive concepts disclosed herein. The storm top adaptive beam scanning system 100 may include a weather radar receiver/transmitter 108 (e.g., similar to or exactly the same as the communication system 104), an adjustable weather radar antenna 110 and a tilt control 112 for automatically controlling the tilt angle (mechanically or electronically) of the radar antenna 110. The storm top adaptive beam scanning system 100 may further include one or more displays 114 as described with reference to FIG. 1, and one or more user interface elements 22 as described with reference to FIG. 1. The storm top adaptive beam scanning system 100 may be in communication with one or more remote data sources, such as the terrestrial station 102, another aircraft, or another ground station, via the communication system 104 (e.g., radio or other wireless communication device).

The processing circuit 204 includes a processor 120 and a memory 130. The memory 130 may include any type of machine-readable storage device capable of storing radar returns or associated weather data or program instructions for analysis/processing by the processor 120. The memory 130 may be, for example, a non-transitory machine-readable media for carrying or having machine-executable instructions or data structures stored thereon. Such machine-readable media may be any available media that may be accessed by a special purpose computer or other machine with a processor. By way of example, such machine-readable media may include random access memory (RAM), read only memory (ROM), erasable programmable read only memory (EPROM), electrically erasable programmable memory (EEPROM), CD-ROM or other optical disk storage, magnetic disk storage or other magnetic storage devices, or any other medium which may be used to carry or store desired program code in the form of machine-executable instructions or data structures and which may be accessed by a special purpose computer or other machine with a processor. Combinations of the above are also included within the scope of machine-readable storage media. Machine-executable instructions include, for example, instructions and data which cause a special purpose computer or special purpose processing machine to perform a certain function or group of functions. Machine or computer-readable storage media, as referenced herein, do not include transitory media (i.e., signals in space). The storm top adaptive beam scanning system 100 may have one or more memories 130 that use the same or a different memory technology.

In some embodiments, the memory 130 may be capable of storing in a readily addressable and rapidly retrievable manner multiple sets of weather data resulting from multiple antenna sweeps at different angles, although a single scan of data may also be used in some embodiments. The memory 130 may also include a three-dimensional storage buffer for storing weather radar parameters according to X, Y and Z coordinates according to one embodiment. The memory 130 may further store weather data received from external sources, such as the terrestrial station 102. The storage of radar data and the form of the weather data stored therein is not disclosed in a limiting fashion.

In some embodiments, weather data may be stored in the memory 130 as a mathematical equation representing the weather information. The mathematical equation representation may be a piecewise linear function, piecewise non-linear function, coefficients of a cubic spline, coefficients of a polynomial function, that represents vertical representations of a weather condition based on the horizontal scan data and/or horizontal representation of the weather condition based on the vertical scan data. The function may be an equation based on weather parameters that may be sensor driven, model driven, or a merger of sensor and model. Although horizontal scan data is described, alternative embodiments may include Cartesian coordinates, rho/theta input, latitude and longitude coordinates, and altitude. Weather conditions may be estimated for any desired point in space with the vertical dimension being the subject of the Radar Equation (e.g., how much power is returned to the radar receiver given what it is pointed at).

The processor 120 may be implemented in hardware, firmware, software, or any combination of these methods. The storm top adaptive beam scanning system 100 may have one or more processors 120 that use the same or a different processing technology. Additionally, the processor 120 may be a separate component of the storm top adaptive beam scanning system 100 or may be embedded within another component of the storm top adaptive beam scanning system 100. The processor 120 may execute instructions that may be written using one or more programming languages, scripting languages, and assembly languages. The instructions may be carried out by, for example, a special purpose computer, logic circuits, or hardware circuits. The term "execute" is the process of running an application or the carrying out of the operation called for by an instruction. The processor 120 may process data and/or execute applications stored in the memory 130, such as weather data and/or other instructions.

The processor 120 may be included as part of a multi-scan, multi-tilt angle weather radar system and may perform the customary functions performed by a conventional weather radar return processing unit. The processor 120 may also perform several additional operations based upon the additional data and/or instructions provided in the memory 130. In general, the processor 120 may merge or cross qualify portions, or ranges, of the radar returns of several different antenna sweeps at several different tilt angles, and/or weather data received from one or more external sources so that a single, relatively clutter-free image may be presented to the pilot based upon the several separate scans. The radar returns may be processed by the processor 120 to generate a 2-D, 3-D, or 4-D weather profile of the weather near the aircraft 30. In some embodiments, the processor 120 may merge or cross qualify portions, or ranges, of the radar returns or weather data of several different sources, including weather data from one or more remote sources (e.g., the terrestrial station 102, a satellite, other aircraft), so that a composite or fused image may be presented to the pilot based upon the several weather data sources.

The processor 120 may process weather radar returns to identify or sense the presence of weather conditions in front of (e.g., in the flight path) or in view of the aircraft 30. In some embodiments, the processor 120 may utilize the altitude and range of the weather condition to generate a vertical profile associated with the weather. The processor 120 may scan across an array of azimuths to generate a 3-D weather profile of the weather near the aircraft 30, which may be stored for later presentation and/or displayed on the flight displays 20. In some embodiments, additional visual indicators other than the representation of weather are provided on the flight displays 20. In some embodiments, a range and bearing matrix having range markers indicating distance from a current location of the aircraft 30 and bearing markers indicating azimuths from a current flight path or bearing of the aircraft 30 may be provided and may assist the pilot in cognitive recognition of weather features from the pilot's perspective.

Figure 5:
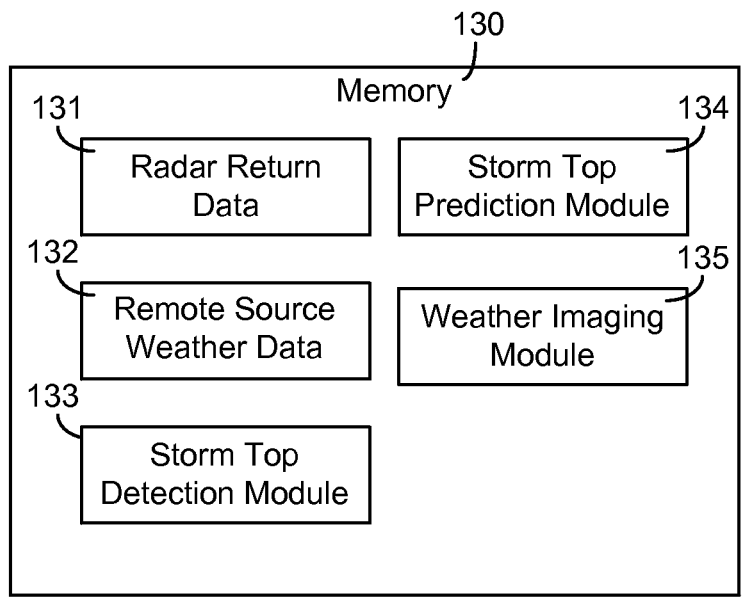
FIG. 5 is a block diagram of a memory of the processing circuit of the storm top adaptive beam scanning system, according to an exemplary embodiment.

Referring now to FIG. 5, a block diagram of the memory 130 of the processing circuit 204 of the storm top adaptive beam scanning system 100 is shown according to an exemplary embodiment of the inventive concepts disclosed herein. The memory 130 is configured to receive and store data, including radar return data 131 (e.g., received from the radar antenna 110 via the radar receiver/transmitter 108) and remote source weather data 132 (e.g., received from the terrestrial station 102 or other aircraft via the communication system 104). The memory 130 further includes a storm top detection module 133, a storm top prediction module 134, and a weather imaging module 135.

The radar return data 131 from the radar antenna 110 may be captured by the radar system 50 during normal operation of the radar system 50. The radar antenna 110 may generally be limited in range due to general performance limits. For example, using the radar return data 131, the processor 120 may only be able to detect turbulence up to 40 nm away, vertical weather threats up to 100 nm away, and lightning threats up to 160 nm away. Remote source weather data 132 may be received from the terrestrial station 102 or another source and may generally include weather data for areas beyond the range of the radar antenna 110. For example, the terrestrial station 102 may receive radar returns covering a wider area the radar antenna 110 is able to cover from one or more ground-based radars. The terrestrial station 102 may generate weather data to transmit to the radar system 50 based on radar returns from the ground-based radars and weather data received from satellites.

The remote source weather data 132 may be sent by the terrestrial station 102 in a data format similar to the format of the radar return data 131. The remote source weather data 132 may then be correlated with the radar return data 131 by the processor 120. Regions of interest identified by the remote source weather data 132 that are not in range of radar return data 131 may be determined by correlating and comparing the two sets of data.

The storm top detection module 133 is configured to detect a storm top height by determining a height of a storm cell. The storm top detection module 133 is configured to receive the radar return data 131 and/or the remote source weather data 132 from the memory 130. In some embodiments, the processor 120 is configured to control the tilt angle of the radar antenna 110 via the tilt control 112 based on information received from the storm top detection module 133. For example, in one embodiment, the storm top detection module 133 determines the storm top of a weather cell or thunderstorm based on radar return data 131 from an initial radar scan indicative of a characteristic of the storm cell or thunderstorm to determine a characteristic of a second radar scan (e.g., direction, location, speed, sensitivity, distance range, altitude range), and the processor 120 controls the tilt angle of the radar antenna 110 based on the storm top of the weather cell. In some embodiments, the storm top detection module 133 determines the storm top height based on interpreting radar return data 131 indicative of an area of a storm cell or thunderstorm having a reflectivity above a threshold level of decibel relative to Z (dBZ) (e.g., 20 dBZ or higher). The storm top detection module 133 may determine the dBZ value for various portions of a storm cell along a radar scan to determine the storm top of the storm cell. For example, the storm top detection module 133 may be configured to determine the location of a storm top height based on the dBZ value for a particular location being equal to or greater than 20 dBZ. In some embodiments, a different dBZ value may indicate the top of a storm cell. In some embodiments, the storm top detection module 133 may determine the location of a storm top based on the dBZ value for a particular location and another condition or characteristic (e.g., temperature, altitude, humidity, wind speed, wind direction, storm cell maturity data, storm cell hazard data, atmospheric instability). The storm top detection module 133 may determine the storm top height based on radar return data 131 acquired from a single vertical scan, a single horizontal scan, multiple vertical scans, multiple horizontal scans, a single scan in a direction that is both vertical and horizontal, multiple scans in a direction that is both vertical and horizontal, or any other type of radar scan, based on radar return data received from an external source, or any combination of the above. In some embodiments, the storm top detection module 133 may determine the storm top height based on radar return data 131 acquired from a single horizontal scan that includes a plurality of horizontal scan segments.

The storm top prediction module 134 performs operations associated with predicting a height of a storm cell at a future time. The storm top prediction module 134 is configured to receive the radar return data 131 and/or the remote source weather data 132 from the memory 130. The storm top prediction module 134 is configured to predict the location of a storm top height based on the radar return data 131 and/or the remote source weather data 132. For example, the storm top prediction module 134 may predict or forecast the future location and/or formation of a storm top based characteristics of a current storm cell or environmental conditions, including the dBZ value for a particular location and among other conditions including, but not limited to temperature, altitude, humidity, wind speed, wind direction, storm cell maturity data, storm cell hazard data, atmospheric instability. In some embodiments, the storm top prediction module 134 is configured to predict the location of a storm top height at a future time based on a characteristic of a current storm top as detected by the storm top prediction module 134 (e.g., location, intensity, humidity, ice level).

The weather imaging module 135 may generally be configured to utilize weather data from radar return data 131 and remote source weather data 132 to provide individual, composite, fused, or overlay image data indicative of a weather condition for display on display 114. The derived image data may be spatially correlated by weather imaging module 135 using, for example, time of sensing information and motion vector values. In some embodiments, growth and decay information may be received, which may be used by weather imaging module 135 to increase or decrease the size, shape, and intensity of an image or other visual indication of a weather condition displayed in accordance with time.

In some embodiments, the weather imaging module 135 may determine a confidence factor reflecting the degree to which weather data received from multiple sources agree in their characterization of the weather condition. In some embodiments, the weather imaging module 135 may combine estimates of storm top height received from multiple sources of weather data to provide image data indicative of the vertical extent of a weather condition. In some embodiments the weather imaging module 135 is configured to generate display data indicative of an outline of the top of a storm cell or thunderstorm and provide the generated display data to the display 114. In some embodiments, the display 114 is configured to provide a vertical display of a weather condition, storm cell formation, and/or storm top outline based on the radar return data 131. In some embodiments, the display 114 is configured to provide at least one of a visual, textual, and aural alert based on the radar return data 131.

Figure 6:
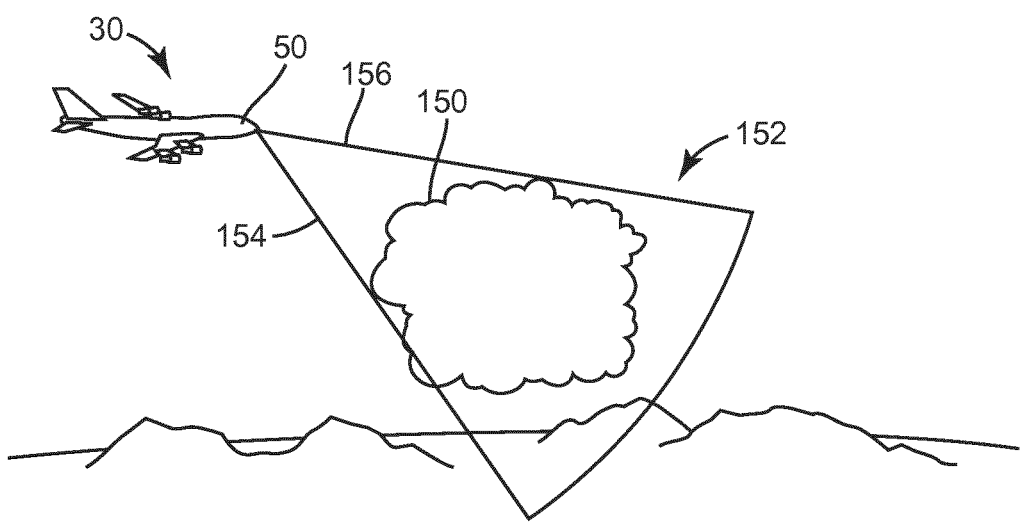
FIG. 6 is a schematic illustration of the storm top adaptive beam scanning system conducting a vertical scan of a weather cell or thunderstorm as part of a storm top adaptive beam scan, according to an exemplary embodiment.

Referring now to FIG. 6, a schematic illustration of the storm top adaptive beam scanning system 100 conducting a vertical scan of a weather cell or thunderstorm 150 as part of a storm top adaptive beam scan (STABS) is shown according to an exemplary embodiment. As shown, the processor 120 of the storm top adaptive beam scanning system 100 is configured to control the radar system 50 to conduct a radar scan 152 in a vertical manner and receive radar return data indicative of reflective energy from the storm cell or thunderstorm 150. In some embodiments, the processor 120 controls the radar system 50 to start an initial radar scan 152 at an initial position 154 and to end the radar scan 152 at a second position 156. In some embodiments, the radar scan 152 is a series of vertical radar beams. As shown in FIG. 6, the first position 154 is at a lower altitude than the second position 156, though in some embodiments the second position 156 may be at a lower altitude than the first position 154. For example, as shown in FIG. 6, the radar scan 152 returns data indicative of the altitude of a storm top height when in the second position 156.

The processor 120 is configured to cause the radar system 50 to conduct a second scan based on detecting and determining the location of a storm top height based on weather data obtained from a first scan (e.g., via the storm top detection module 133). In some embodiments, the first scan is an initial scan of a weather cell made by the weather radar system. The processor 120 is configured to conduct the second scan in a horizontal manner based on the location of the storm top height. In some embodiments, the processor 120 controls the radar antenna 110 via the tilt control 112 based on the dBZ value of the storm cell as determined by the storm top detection module 133. For example, upon the radar scan 152 reaching the second position 156, the storm top detection module 133 detects and determines the location of a storm top height (e.g., based on the dBZ level of an area of the thunderstorm 150). Based on the storm top detection module 133 detecting the storm top height, the processor 120 is further configured to control the radar system 50 to conduct a second radar scan in a horizontal direction at the same altitude of the detected storm top. For example, upon detecting a storm top height at 30,000 ft based on weather data received from the vertical radar scan 152, the processor 120 may control the radar system 50 to conduct a horizontal radar scan at 30,000 ft.

In some embodiments, the processor 120 is configured to control the radar system 50 to conduct an adaptive horizontal radar scan to trace the top of the thunderstorm 150. For example, the processor 120 may be configured to direct the adaptive horizontal scan along the top of the thunderstorm 150 based on the radar return data 131 and/or the remote source weather data 132. In some embodiments, the processor 120 is configured to direct the adaptive horizontal scan along the top of the thunderstorm 150 based on data received from the storm top detection module 133 and/or the storm top prediction module 134. The processor 120 may be configured to adjust the radar scan angle or altitude of the adaptive horizontal scan while the scan is being performed based on the data received from the storm top detection module 133 and/or the storm top prediction module 134. Adjusting the radar scan angle or altitude of the adaptive horizontal scan mid-scan advantageously scans an outline of the entire storm top (or half of the storm top) in a single adaptive horizontal scan (i.e., multiple horizontal scans at various angles/altitudes may not be necessary to scan the outline of a storm top in some embodiments). Adjusting the altitude of the adaptive horizontal scan mid-scan reduces the number of scans and amount of time required to acquire data indicative of the storm top.

In some embodiments, the adaptive horizontal scan is adjusted based on a detected characteristic of the storm. In some embodiments, the adaptive horizontal scan is adjusted in real time. For example, the altitude or angle of the adaptive horizontal scan is adjusted based on the reflectivity of the area that is currently being scanned. For example, upon the vertical scan returning weather data that indicates a storm top has been detected at an initial altitude (e.g., vertical scan returning data indicative of a dBZ value of 20), an adaptive horizontal scan is conducted at the first altitude in an initial direction until the adaptive horizontal scan returns data that indicate the scan is no longer being performed on the storm top (e.g., data indicates a dBZ value of greater than 50 or less than 20), then the adaptive horizontal scan is adjusted to continue the adaptive horizontal scan in the first direction at a second altitude greater or lower than the first altitude. In some embodiments, the adaptive horizontal beam scan is representative of a step-wise pattern where several partial vertical and horizontal scans conducted in sequence form a full adaptive horizontal beam scan. For example, the adaptive horizontal beam scan may step up or step down in altitude (e.g., stepwise) before continuing in a horizontal direction based on returning weather data indicative of the storm top being at an altitude other than the current altitude of the adaptive horizontal scan. In some embodiments, the altitude of the adaptive horizontal scan is adjusted to continue the horizontal scan at a different altitude based on the horizontal scan returning reflectivity data that deviates from the reflectivity data indicative of a storm top altitude by a threshold amount (e.g., 5 dBZ higher/lower, 5% higher/lower dBZ value).

In some embodiments, two adaptive horizontal scans are performed due the storm top height being detected in the middle of a storm cell or thunderstorm (e.g., one adaptive horizontal scan is performed in an initial horizontal direction and a second horizontal scan is performed in a second horizontal direction opposite of the first horizontal direction). For example, an aircraft traveling due north may detect a storm top directly due north of the aircraft based on a vertical scan conducted in a due north direction from the aircraft, and then conduct an initial adaptive horizontal scan westward and a second adaptive horizontal scan eastward from where the storm top height was initially detected by the vertical scan.

Figure 7:
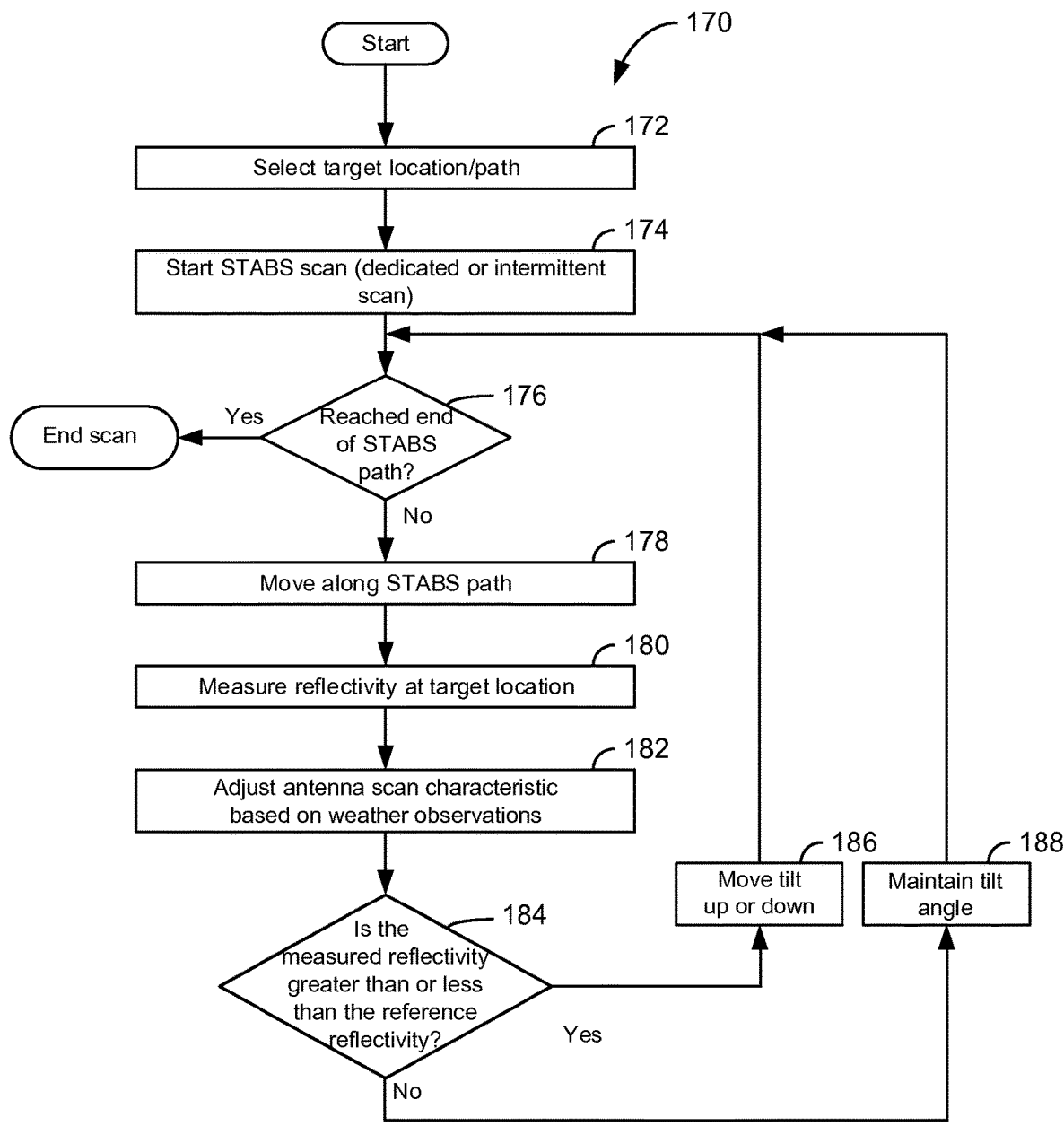
FIG. 7 is a flow diagram of a process for controlling a weather radar system to adaptively scan the storm top of a thunderstorm, according to an exemplary embodiment.

Referring now to FIG. 7, a flow diagram of a process 170 for controlling a weather radar system to adaptively scan the storm top of a thunderstorm is shown according to an exemplary embodiment. The process 170 may be implemented using any of the systems/apparatuses disclosed herein, such as on the aircraft 30 and/or using the storm top adaptive beam scanning system 100.

At 172, a target radar scanning location and/or flight path to scan is selected by a user operating the storm top adaptive beam scanning system 100 (e.g., pilot, aircraft crew, flight tower controller). For example, in some embodiments, the storm top adaptive beam scanning system 100 may be configured to conduct radar scans to determine the outline of storm top heights along a planned flight path for the duration of the flight. In some embodiments, the storm top adaptive beam scanning system 100 scans straight ahead of the aircraft 30 or along any one of a number of preset scanning patterns. In some embodiments, the storm top adaptive beam scanning system 100 may be configured to scan along a path drawn by a user on a display system (e.g., the flight displays 20) using a touchpad (e.g., UI elements 22).

At 174, the storm top adaptive beam scanning system 100 begins performing a STABS. In some embodiments, the STABS may be a dedicated scan or intermittent scan. The STABS may include a single or multiple radar scans conducted in a vertical manner or a horizontal manner, or a combination of vertical and horizontal scans. In some embodiments, the STABS may conduct certain scans at different resolutions (e.g., horizontal segments of the STABS may be conducted at higher-resolutions than vertical segments). In some embodiments, the higher-resolution scans are performed at a slower rate than lower-resolution scans, which allow for a higher data resolution and greater accuracy in detecting and displaying storm tops.

At 176, the storm top adaptive beam scanning system 100 determines whether the STABS has reached the end of a path. The storm top adaptive beam scanning system 100 may determine that the STABS has reached the end of a path based on the STABS reaching the terminal end of a thunderstorm or weather cell. For example, upon a horizontal scan reaching a location having a dBZ level that no longer indicates that the scan is at the altitude of the storm height, the storm top adaptive beam scanning system 100 may control the radar beam in a vertical direction to acquire weather data at a lower or higher altitude. If weather data acquired from the vertical scan does not return data indicative of a storm top (e.g., a dBZ value greater than 20), the storm top adaptive beam scanning system 100 may determine that the end of storm cell has been reached. In some embodiments, the storm top adaptive beam scanning system 100 is configured to determine that the end of the STABS path has been reached based on STABS scan reaching the terminal point of a scanning area (e.g., defined by a current flight plan, a future flight plan, a selected scanning area). Upon determining that the STABS has reached the end of a path, the storm top adaptive beam scanning system 100 ends the scan. In some embodiments, the storm top adaptive beam scanning system 100 is configured to end the current scan but to continue scanning at another location or in another direction. In some embodiments, the storm top adaptive beam scanning system 100 ends the STABS operation.

At 178, upon the storm top adaptive beam scanning system 100 determining that the STABS has not yet reached the end of a path, the storm top adaptive beam scanning system 100 continues the STABS to move along the scan path. At 180, the storm top adaptive beam scanning system 100 measures a meteorological property of the scan area (e.g., the reflectivity of a location within a storm cell).

At 182, the storm top adaptive beam scanning system 100 adjusts an antenna scan characteristic of a weather radar system (e.g., radar antenna 110 of the radar system 50) based on the weather observations. In some embodiments, the rate that the antenna scans may be slowed. For example, the rate that the antenna scans may be slowed due to atmospheric or meteorological conditions and/or so that a higher resolution scan may be performed. For example, while the aircraft 30 flies through a dense cloud formation, a STABS may take longer to perform due to the present reflectivity of the cloud formation, which may act as noise for the weather radar system 50. The storm top adaptive beam scanning system 100 may slow the rate of the scan down in such situations so as to obtain the most accurate data possible.

At 184, the storm top adaptive beam scanning system 100 determines whether the measured reflectivity is greater than or less than a reference reflectivity. The reference reflectivity may be indicative of a storm top height (e.g., 20 dBZ) and/or defined by a user input.

At 186, if the storm top adaptive beam scanning system 100 determines that the measured reflectivity is greater than or less than the reference reflectivity, the storm top adaptive beam scanning system 100 moves the tilt of the antenna up or down so as to scan at an altitude different from the current altitude of the scan. If the storm top adaptive beam scanning system 100 determines that the measured reflectivity is greater than the reference reflectivity, the storm top adaptive beam scanning system 100 moves the tilt of the antenna up so as to scan at a higher altitude than the current scan altitude. If the storm top adaptive beam scanning system 100 determines that the measured reflectivity is less than the reference reflectivity, the storm top adaptive beam scanning system 100 moves the tilt of the antenna down so as to scan at a lower altitude than the current scan altitude. At 188, if the storm top adaptive beam scanning system 100 determines that the measured reflectivity is not greater than or less than the reference reflectivity (e.g., if the measured reflectivity is the same as the reference reflectivity), the storm top adaptive beam scanning system 100 maintains the tilt of the tilt of the antenna at the current tilt angle so as to continue scanning at the current altitude. In some embodiments, the storm top adaptive beam scanning system 100 is configured to move the tilt angle of the antenna up or down only if the measured reflectivity is greater than or less than the reference reflectivity by a threshold value (e.g., greater or less than 5 dBZ, 10 dBZ, 5% of the reference reflectivity, 20% of the reference reflectivity). The process 170 then returns to step 176.

The inventive concepts disclosed herein are described above with reference to drawings. These drawings illustrate certain details of specific embodiments that implement the systems and methods and programs of the inventive concepts disclosed herein. However, describing the inventive concepts disclosed herein with drawings should not be construed as imposing on the inventive concepts disclosed herein any limitations that may be present in the drawings. The inventive concepts disclosed herein contemplate methods, systems and program products on machine-readable media capable of accomplishing its operations. The embodiments of the inventive concepts disclosed herein may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step of the inventive concepts disclosed herein are intended to be dedicated to the public, regardless of whether the element, component or method step is explicitly recited in the claims.

Some embodiments of the inventive concepts disclosed herein are described in the general context of method steps which may be implemented in one embodiment by a program product including machine-executable instructions, such as program code, for example, in the form of program modules executed by machines in networked environments. The program modules may include routines, programs, objects, components, and data structures that perform particular tasks or implement particular data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the inventive concepts disclosed herein may be practiced in a networked environment using logical connections to one or more remote computers having processors. Logical connections may include a local area network (LAN) and a wide area network (WAN) that are presented here by way of example and not limitation. Such networking environments may use computer networks, intranets, and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the inventive concepts disclosed herein may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It should be noted that although the flowcharts and diagrams provided herein may show a specific order of method steps, it is understood that the order of these steps may differ from what is depicted. Also two or more steps may be performed concurrently or with partial concurrence. Such variation may depend on the software and hardware systems chosen and on designer choice. It is understood that all such variations are within the scope of the inventive concepts disclosed herein. Likewise, software and web implementations of the inventive concepts disclosed herein may be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the inventive concepts disclosed herein have been presented for purposes of illustration and description. It is not intended to be exhaustive or to limit the inventive concepts disclosed herein to the precise form disclosed, and modifications and variations are possible in light of the above teachings or may be acquired from practice of the inventive concepts disclosed herein. The embodiments were chosen and described in order to explain the principals of the inventive concepts disclosed herein and their practical application to enable one skilled in the art to utilize the inventive concepts disclosed herein in various embodiments and with various modifications as are suited to the particular use contemplated.

What is claimed is:

1. A weather radar system, comprising:
   at least one processor coupled with a non-transitory processor-readable medium storing processor-executable code for causing the at least one processor to:
      control a radar antenna to conduct a plurality of first radar scans of a weather cell over a first scan area defined by a plurality of first scan altitudes;
      receive first radar return data indicative of a characteristic of the first scan area;
      determine a first storm top altitude of a storm top of the weather cell for a first location based on the characteristic of the first scan area;
      control the radar antenna to conduct a second radar scan of the weather cell at the first storm top altitude and a first azimuth angle;
      receive second radar return data indicative of a characteristic of a second scan area;
      identify a second reflectivity of the weather cell based on the second radar return data;
      determine whether the second reflectivity satisfies a condition indicating that the second radar scan was directed towards the storm top;
      responsive to the second reflectivity satisfying the condition, perform a third radar scan of a third scan area of the weather cell at the first storm top altitude and a second azimuth angle different than the first azimuth angle and receive third radar return data indicative of a characteristic of the third scan area;
      responsive to the second reflectivity not satisfying the condition, perform a fourth radar scan of a fourth scan area the weather cell at a second storm top altitude different than the first storm top altitude and the second azimuth angle and receive fourth radar return data indicative of a characteristic of the fourth scan area; and
      cause a display device to display storm top height data indicative of the storm top of the weather cell based on at least one of the first radar return data, the second radar return data, or one of the third radar return data or the fourth radar return data.

2. The weather radar system of claim 1, wherein the characteristic of the first scan area and the characteristic of the second scan area correspond to a respective reflectivity.

3. The weather radar system of claim 1, wherein the non-transitory processor-readable medium stores processor-executable code for causing the at least one processor to control the radar antenna to conduct at least one fifth radar scan at a third storm top altitude.

4. The weather radar system of claim 3, wherein the first storm top altitude, the second storm top altitude, and the third storm top altitude are each different.

5. The weather radar system of claim 4, wherein the second radar scan, the third radar scan, and the fourth radar scan are conducted in a stepwise manner.

6. The weather radar system of claim 3, wherein the first storm top altitude and third storm top altitude are the same altitude.

7. The weather radar system of claim 1, wherein the second radar scan is conducted at a higher resolution than the plurality of first radar scans.

8. The weather radar system of claim 1, wherein the non-transitory processor-readable medium further stores processor-executable code for causing the at least one processor to control the radar antenna to conduct a plurality of fifth radar scans of the weather cell, wherein the second radar scan originates at a location of the storm top as determined based on the plurality of first radar scans and is conducted in a first azimuthal direction, and wherein the plurality of fifth radar scans originate at the location of the storm top as determined based on the plurality of first radar scans and are conducted in a second azimuthal direction opposite the first azimuthal direction.

9. The weather radar system of claim 1, wherein the storm top height data is indicative of an outline of the storm top of the weather cell.

10. The weather radar system of claim 1, wherein at least one of (i) the second radar scan, (ii) the third radar scan, or (iii) the fourth radar scan is conducted at a higher resolution than the plurality of first radar scans.

11. The weather radar system of claim 1, wherein the non-transitory processor-readable medium further stores processor-executable code for causing the at least one processor to determine the second storm top altitude in response to a reflectivity of the weather cell being different from a reflectivity of the storm top by a threshold amount.

12. A method, comprising:
   controlling a radar antenna to conduct a plurality of first radar scans of a weather cell over a first scan area defined by a plurality of first scan altitudes;
   receiving first radar return data indicative of a characteristic of the first scan area of the weather cell from the plurality of first radar scans;
   determining a first storm top altitude of the weather cell based on the characteristic of the first scan area;
   controlling the radar antenna to conduct a second radar scan of the weather cell at the first storm top altitude and a first azimuth angle;
   receiving second radar return data indicative of a characteristic of a second scan area;
   identifying a second reflectivity of the weather cell based on the second radar return data;
   determining whether the second reflectivity satisfies a condition indicating that the second radar scan was directed towards the storm top;

responsive to the second reflectivity satisfying the condition, performing a third radar scan of a third scan area of the weather cell at the first storm top altitude and a second azimuth angle different than the first azimuth angle and receive third radar return data indicative of a characteristic of the third scan area;

responsive to the second reflectivity not satisfying the condition, performing a fourth radar scan of a fourth scan area of the weather cell at a second storm top altitude different than the first storm top altitude and a third azimuth angle different than the first azimuth angle and receive fourth radar return data indicative of a characteristic of the fourth scan area; and determining a second location of the storm top based on the third radar return data or the fourth radar return data.

13. The method of claim 12, wherein the characteristic of the first scan area and the characteristic of the second scan area are indicative of a corresponding reflectivity.

14. The method of claim 12, further comprising controlling the radar antenna to conduct a plurality of fifth radar scans of the weather cell, wherein the second radar scan originates at a location of the storm top as determined based on the plurality of first radar scans and is conducted in a first azimuthal direction, and wherein the plurality of fifth radar scans originate at the location of the storm top as determined based on the plurality of first radar scans and are conducted in a second azimuthal direction opposite the first azimuthal direction.

15. The method of claim 12, wherein the second radar scan is conducted at a higher resolution than the plurality of first radar scans.

16. An adaptive horizontal beam scanning system, comprising:

a weather radar system including a radar antenna; and at least one processor coupled with the weather radar system and a non-transitory processor-readable medium storing processor-executable code for causing the at least one processor to:

transmit a plurality of first radar beams at a plurality of first scan altitudes of a first area of a weather cell;

receive first radar return data indicative of a first reflectivity of the first area of the weather cell;

determine a first storm top altitude of a storm top of the weather cell based on the first reflectivity of the first area;

transmit a second radar beam at the first storm top altitude and a first azimuth angle;

receive second radar return data indicative of a second reflectivity of the weather cell;

determine whether the second reflectivity satisfies a condition indicating that the second radar beam was transmitted at the storm top;

responsive to the second reflectivity satisfying the condition, transmit a third radar beam at the first storm top altitude and a second azimuth angle different than the first azimuth angle and receive third radar return data indicative of a third reflectivity of the weather cell;

responsive to the second reflectivity not satisfying the condition, transmit a fourth radar beam at a second storm top altitude different than the first storm top altitude and the second azimuth angle and receive fourth radar return data indicative of a fourth reflectivity of the weather cell; and cause a display device to display storm top height data indicative of the storm top of the weather cell based on at least one of the first radar return data, the second radar return data, or one of the third radar return data or the fourth radar return data.

17. The adaptive horizontal beam scanning system of claim 16, wherein transmitting the plurality of first radar beams is an initial radar scan of the weather cell.

18. The adaptive horizontal beam scanning system of claim 16, wherein the first storm top altitude and the second storm top altitude are different.

19. The adaptive horizontal beam scanning system of claim 16, wherein the condition corresponds to a threshold reflectivity of at least 20 dBZ.

* * * * *